United States Patent [19]
Yamazaki et al.

[11] Patent Number: 4,917,474
[45] Date of Patent: Apr. 17, 1990

[54] OPTOELECTRONIC PANEL AND METHOD OF MAKING THE SAME

[75] Inventors: Shunpei Yamazaki; Akira Mase; Toshimitsu Konuma, all of Tokyo, Japan

[73] Assignee: Semiconductor Energy Laboratory Co., Ltd., Atsugi, Japan

[21] Appl. No.: 198,699

[22] Filed: May 23, 1988

Related U.S. Application Data

[63] Continuation of Ser. No. 774,500, Sep. 10, 1985, abandoned.

[30] Foreign Application Priority Data

Sep. 10, 1984 [JP] Japan ................. 59-189183
Sep. 10, 1984 [JP] Japan ................. 59-189184

[51] Int. Cl.⁴ .................. G02F 1/35; G06F 3/02
[52] U.S. Cl. .................. 350/333; 350/342
[58] Field of Search .......... 350/332, 342, 333; 340/784; 357/30 H, 30 K, 59 B, 59 C

[56] References Cited

U.S. PATENT DOCUMENTS

| | | | |
|---|---|---|---|
| 3,700,802 | 10/1972 | Markin et al. ............. | 350/342 |
| 3,946,151 | 3/1976 | Kamiyama et al. ........ | 357/30 H |
| 4,345,248 | 8/1982 | Togashi et al. ............ | 350/342 |
| 4,363,963 | 12/1982 | Ando ....................... | 357/30 H |
| 4,518,815 | 5/1985 | Yamazaki .................. | 357/59 C |
| 4,534,622 | 8/1985 | Harada et al. ............ | 350/342 |
| 4,586,039 | 4/1986 | Nonomura et al. ....... | 340/784 |
| 4,589,733 | 5/1986 | Yaniv et al. .............. | 350/332 |
| 4,622,432 | 11/1986 | Yamazaki .................. | 357/30 K |
| 4,655,552 | 4/1987 | Togashi et al. ............ | 350/342 |

FOREIGN PATENT DOCUMENTS 56-70530 6/1981 Japan ..................... 350/342

*Primary Examiner*—Rodney B. Bovernick
*Assistant Examiner*—Martin Lerner
*Attorney, Agent, or Firm*—Sixbey, Friedman, Leedom & Ferguson

[57] ABSTRACT

An optoelectronic panel is disclosed wherein the liquid crystal device and the photo detecting device are formed on a common transparent substrate. The liquid crystal display device includes at least one liquid crystal element which is supplied with a drive signal via a non-single-crystal semiconductor diode serving as a non-linear element and a photo diode of the same structure as the non-single-crystal semiconductor diode serving as the non-linear element of the liquid crystal display device. The liquid crystal display device and the photo detecting device are disposed side by side on the transparent substrate. The liquid crystal element, the non-linear element, the non-single-crystal element and the non-single-crystal semiconductor diode, as the non-linear element, of the liquid crystal display device are formed adjacent one another on the transparent substrate. The one electrode of the liquid crystal element and the one electrode of the non-single-crystal semiconductor diode, serving as the photo diode are both formed on the transparent substrate and are transparent. The one electrode of the non-single-crystal semiconductor diode serving as the non-linear element is also formed on the transparent first substrate but is nontransparent.

15 Claims, 6 Drawing Sheets

OPTOELECTRONIC PANEL AND METHOD OF MAKING THE SAME

This application is a continuation of Ser. No. 774,500, filed 9/10/85, now abandoned.

BACKGROUND OF THE INVENTION

1. Field of the Invention

The present invention relates to an optoelectronic panel which has at least a liquid crystal display device and a photo detecting device formed on a common substrate. The invention also pertains to a method for the manufacture of such a panel.

2. Description of the Prior Art

Heretofore there has been proposed a display panel which employs m×n (where n≧1 and m≧1) liquid crystal display devices $D_{11}$ to $D_{1n}$, $D_{21}$ to $D_{2n}$, ... and $D_{m1}$ to $D_{mn}$.

In this display panel, a liquid crystal element $C_{ij}$ (where i=1, 2 ... m; j=1, 2 ... n) is connected via a nonlinear element $H_{ij}$ to a row line $x_i$ and a column line $Y_j$ at their intersection.

With such a display panel, an image display can be provided by driving the liquid crystal elements at the intersections of selected ones of row lines $x_1$ to $x_m$ and column lines $Y_1$ to $Y_n$ through the selected lines.

The conventional display panel employs insulated gate FETs as the nonlinear elements. The manufacture of the insulated gate FET calls for many steps using as many as six to eight photo masks.

Accordingly, the conventional display panel cannot be fabricated with high production yield, with ease and at low cost.

Furthermore, there has been proposed a write panel which employs m×n pressure-sensitive elements $K_{11}$ to $K_{1n}$, $K_{21}$ to $K_{2n}$, ... and $K_{m1}$ to $K_{mn}$ and in which the pressure-sensitive element $K_{ij}$ (where i=1, 2, ... m and j=1, 2, ... n) is connected between a row line $X_i$ and a column line $Y_j$ at their intersection.

With such a panel, by a pressurized write thereon by a pen or similar means, the coordinates of its locus on the panel can be output on the row and column lines $X_1$ to $X_m$ and $Y_1$ to $Y_n$.

It is difficult, however, to press the pressure-sensitive elements under the locus with a predetermined value, and the pressure-sensitive elements are easily fatigued and are relatively low in response speed.

Accordingly, the conventional write panel is defective in that the coordinates of a locus of a pen or the like cannot be output on the row and column lines with high reliability and at high speed.

Moreover, there has not been proposed a highly useful panel which has the functions of both a display panel and write panel. Conventionally, it is therefore necessary to employ a display panel and a write panel for obtaining the both functions.

SUMMARY OF THE INVENTION

It is therefore an object of the present invention to provide a novel optoelectronic panel which is free from the abovesaid defects of the prior art.

In accordance with an aspect of the present invention, a liquid crystal display device and a photo detecting device are both formed on a common substrate. Accordingly, the functions of the display panel and the write panel can be obtained with one panel.

In accordance with another aspect of the present invention, the liquid crystal display device has at least one liquid crystal element, across which a drive signal is applied via a nonlinear element. In this instance, the nonlinear element is a non-single-crystal semiconductor diode. Liquid crystal of the liquid crystal element becomes transparent or opaque depending upon whether the drive signal is obtained at a level above or below the offset voltage of the non-single-crystal semiconductor diode. Accordingly, the liquid crystal element provides a display with a gradation corresponding to the voltage of the drive signal. The non-single-crystal semiconductor diode, used as the nonlinear element, has an arrangement in which a non-single-crystal layer laminate member of an NIN, NN⁻N, NP⁻N, NIPIN, PIP, PP⁻P, PN⁻P or PINIP structure is disposed between a pair of electrodes.

In accordance with another aspect of the present invention, the photo detecting device has at least one photo diode, which has the same structure as does the non-single-crystal semiconductor diode used as the nonlinear element in the liquid crystal display device. The photo diode creates a photo current corresponding to the intensity of light directed thereto. Therefore, the photo diode produces a photo detecting signal corresponding to the light intensity.

The non-single-crystal semiconductor diodes of the same structure, used in the liquid crystal display device and the photo detecting device, can be manufactured with higher production yield and more easily than the insulated gate FET used as the nonlinear element in the conventional liquid crystal display device.

Accordingly, the optoelectronic panel of the present invention can be fabricated with good yield, with ease and at low cost.

In the optoelectronic panel of the present invention, the liquid crystal device and the photo detecting device are formed on a common transparent substrate, as described above. In this case, the liquid crystal display device includes at least one liquid crystal element which is supplied with a drive signal via the afore-mentioned non-single-crystal semiconductor diode serving as a non-linear element and a photo diode of the same structure as the non-single-crystal semiconductor diode serving as the non-linear element of the liquid crystal display device. The liquid crystal display device and the photo detecting device are disposed side by side on the transparent substrate. The liquid crystal element, the nonlinear element, the non-single-crystal element and the non-single-crystal semiconductor diode, as the nonlinear element, of the liquid crystal display device are formed adjacent one another on the transparent substrate. The one electrode of the liquid crystal element and the one electrode of the non-single-crystal semiconductor diode, serving as the photo diode are both formed on the transparent substrate and are transparent. The one electrode of the non-single-crystal semiconductor diode serving as the nonlinear element is also formed on the transparent first substrate but is nontransparent.

With such an arrangement, the photo detecting device develops a photo current when the photo diode is irradiated by light through the transparent substrate and the transparent electrode of the photo diode, since the electrode of the non-single-crystal semiconductor diode, serving as the photo diode, is transparent and since the electrode of the non-single crystal semiconductor diode, serving as the nonlinear element, are nontransparent, even if the photo detecting device is disposed on the transparent substrate in close proximity to the non-single-crystal semiconductor diode serving as the non-linear element of the liquid crystal display device, the operation of the latter is not substantially affected by the light irradiation of the photo detecting device through the transparent substrate. Accordingly, the functions of the liquid crystal display device and the photo detecting device can sufficiently be obtained in a small area of the transparent substrate independently of each other.

In accordance with another aspect of the present invention, the liquid crystal display device having at least one liquid crystal element which is supplied with the drive signal via a non-single-crystal semiconductor diode serving as the nonlinear element and the photo detecting device having the non-single-crystal semiconductor diode of the same structure as the photo diode are formed on the common substrate, as described above. The one electrode of the liquid crystal element is formed by a transparent first conductive layer formed on the substrate, and the one electrode of the non-single-crystal semiconductor diode serving as a nonlinear element is formed by a nontransparent second conductive layer on the transparent first conductive layer. The non-single-crystal semiconductor laminate layers of the non-single-crystal semiconductor diodes serving as the nonlinear element and as the photo diode are respectively constituted by first and second regions of a common non-single-crystal semiconductor laminate layer which continuously extends on the electrodes of the non-single-crystal semiconductor diodes serving as the nonlinear element and as the photo diode. The other electrodes of the non-single-crystal semiconductor diodes functioning as the nonlinear element and as the photo diode, respectively, are formed by two parts of a third conductive layer which continuously extends on the non-single-crystal semiconductor laminate layer which is common to the non-single-crystal semiconductor diodes serving as the nonlinear element and as the photo diodes, respectively. As described above, the one electrode of the non-single-crystal semiconductor diode acting as the nonlinear element is formed on the second conductive layer forming the one electrode of the liquid crystal element, the non-single-crystal semiconductor laminate layers of the non-single-crystal semiconductor diodes acting as the nonlinear element and as the photo diode, respectively, are formed by the common non-single-crystal semiconductor laminate layer and the other electrodes of the above non-single-crystal semiconductor diodes are formed by the third conductive layer. Therefore, the structure including the liquid crystal display device and the photo detecting device is simple and is easy to obtain.

Other objects, features and advantages of the present invention will become more fully apparent from the following detailed description taken in conjunction with the accompanying drawings.

DESCRIPTION OF THE PREFERRED EMBODIMENTS

Figure 1:
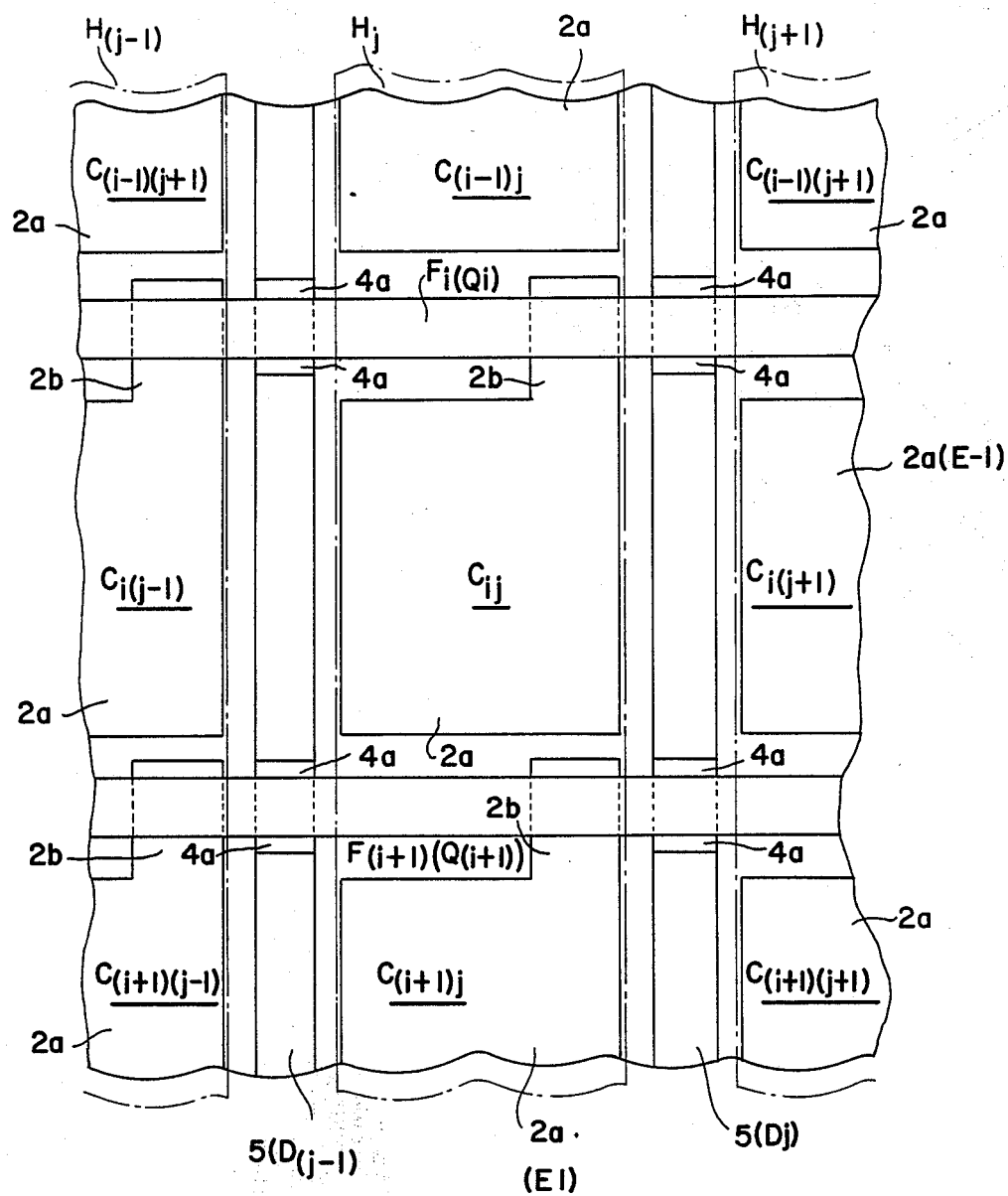
FIG. 1 is a plan view schematically illustrating an embodiment of the optoelectronic panel of the present invention.
Figure 2:
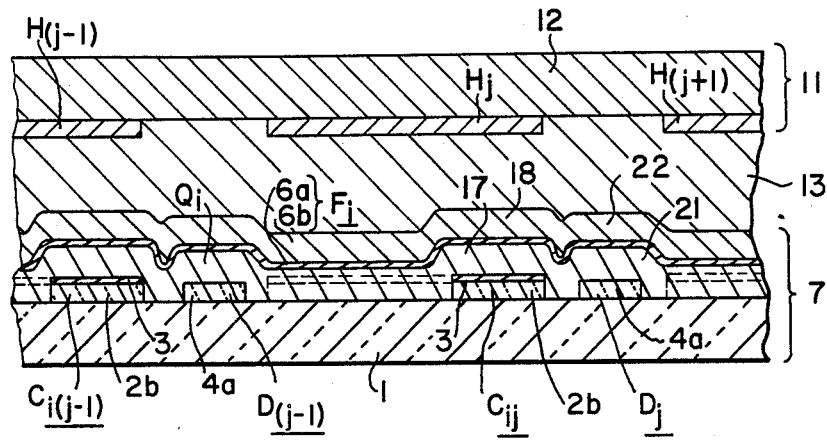
FIGS. 2, 3, 4, 5 and 6 are sectional views respectively taken on the lines II—II, III—III, IV—IV, V—V and VI—VI in FIG. 1.
Figure 3:
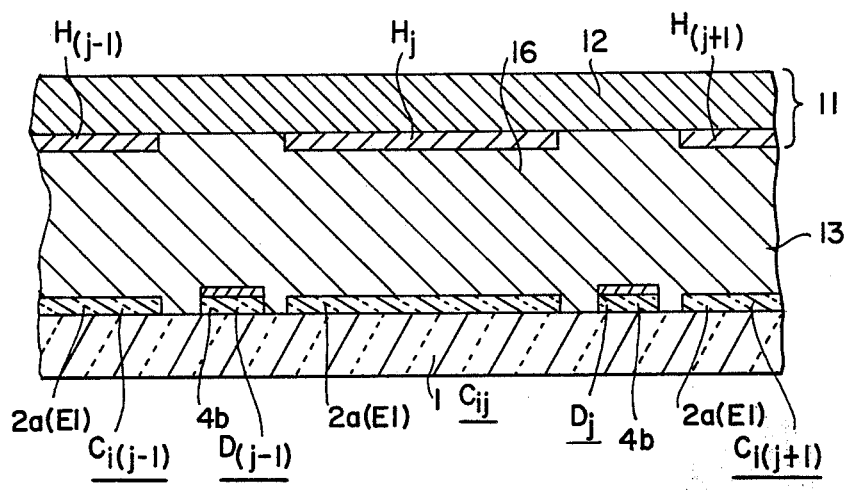
Figure 4:
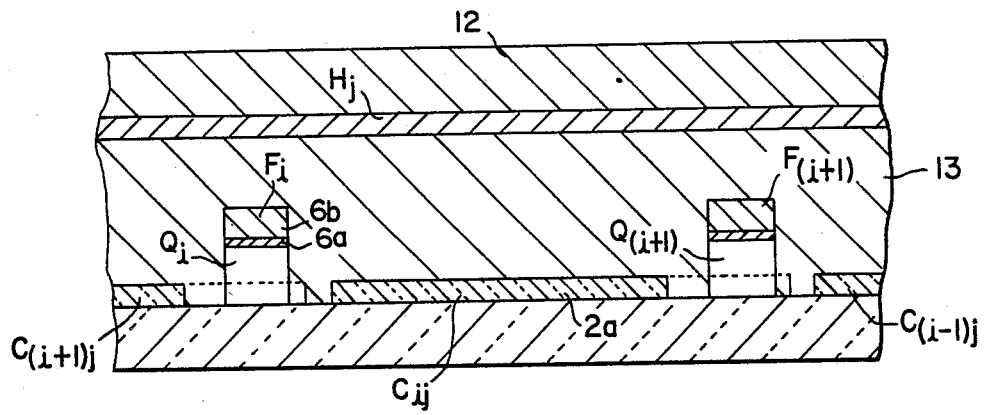
Figure 5:
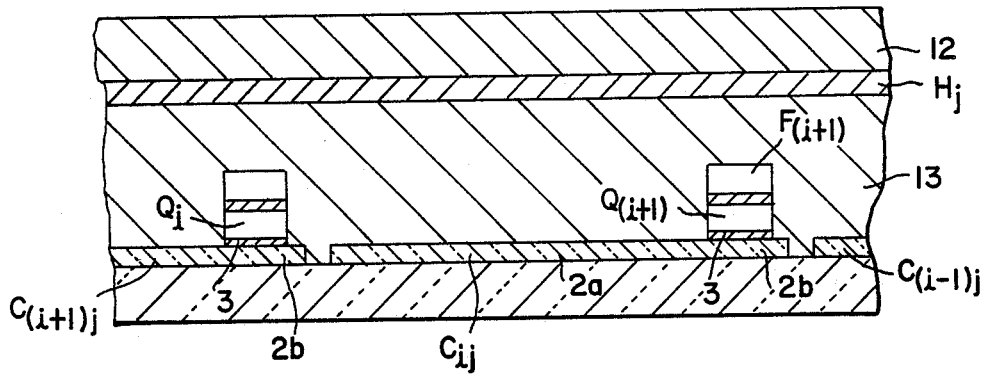
Figure 6:
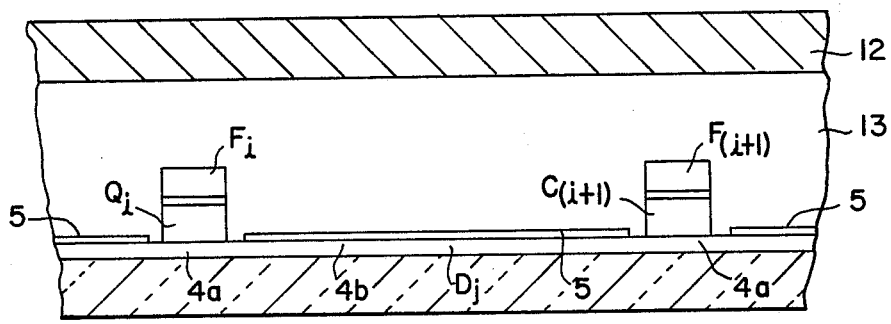

FIGS. 1 to 6 illustrate an embodiment of the optoelectronic panel of the present invention, in which a substrate 1 has an insulating surface. The substrate 1 is transparent and formed of, for instance, alkaline free glass. The substrate 1 has arranged thereon in a matrix form $m \times n$ (which $m \geq 1$ and $n \geq 1$) conductive layers $C_{11}$ to $C_{1n}$, $C_{21}$ to $C_{2n}$, $C_{31}$ to $C_{3n}$, ... and $C_{m1}$ to $C_{mn}$. The conductive layer $C_{ij}$ (where $i = 1, 2, \ldots m$ and $j = 1, 2, \ldots n$) is transparent and has, for example, a relatively large square part $2a$ and a relatively small rectangular part $2b$ which extends from one side of the part $2a$ on the side of the conductive layer $C_{(i-1)j}$ toward it and which is, for example, 100 μm wide and 150 μm long. On the part $2b$ of the conductive layer $C_{ij}$ is formed a square conductive layer 3 which extends across the part $2b$ in its widthwise direction and which measures, for example, $100 \times 100$ μm. The conductive layer 3 is formed of, for instance, chromium and is nontransparent.

On the substrate 1 is formed, for instance, 100 μm wide conductive layer $D_j$ which extends in the column direction between the column of the conductive layers $C_{1j}$ to $C_{mj}$ and the column of the conductive layers $C_{1(j+1)}$ to $C_{m(j+1)}$ or $C_{1(j-1)}$ to $C_{m(j-1)}$ (where let it be assumed that $(j+1)$ does not take the value of $(n+1)$ and $(j-1)$ does not the value of zero). The conductive layer $D_j$ is transparent. On a part $4b$ of the conductive layer $D_j$, except its part $4a$ corresponding to the part $2b$ of the conductive layer $C_{ij}$, is formed a transparent conductive layer 5 which is similar to the conductive layer 3 on the part $2b$ of the conductive layer $C_{ij}$ extending in the column direction.

Furthermore, the substrate 1 has formed thereon, for example, 100 μm wide non-single-crystal semiconductor laminate layer $Q_i$ which continuously extends in the row direction on the conductive layer 3 formed on the parts $2b$ of the conductive layers $C_{i1}$ to $C_{in}$ (or $C_{(i+1)1}$ to $C_{(i+1)n}$ (where let it be assumed that $(i+1)$ does not take the value of $(m+1)$ and $(i-1)$ does not value of zero) and the parts $4a$ of the conductive layers $D_1$ to $D_n$. The non-single-crystal semiconductor laminate layer $Q_i$ has an n (or p)-i-n(or p) structure composed of an n(or p)-type layer, an i-type layer and an n(or p)-type layer, an n(or p)-n⁻(or p⁻)-n(or p) structure composed of an n(or p)-type, an n⁻(or p⁻)-type layer and and n(or p)-type layer, an n(or p)-p⁻(or n⁻)-n(or p) structure composed of an n(or p)-type layer, a p⁻(or n⁻)-type layer and an n(or p)-type layer, or an n(or p)-i-p(or n)-i-n(or p) structure composed of an n(or p)-type layer, an i-type layer, a p(or n)-type layer, an i-type layer and an n(or p)-type layer.

The non-single-crystal semiconductor laminate layer $Q_i$ is covered over the entire area of its surface with a conductive layer $F_i$. The conductive layer $F_i$ is composed of a nontransparent layer 6a formed of, for instance, chromium and overlying the semiconductor layer $Q_i$ and a conductive layer 6b as of aluminum formed on the layer 6a.

The conductive layers $C_{11}$ to $C_{1n}$, $C_{21}$ to $C_{2n}$, $C_{31}$ to $C_{3n}$... and $C_{m1}$ to $C_{mn}$, the conductive layers $D_1$ to $D_n$, the non-single-crystal semiconductor layers $Q_1$ to $Q_n$ and the conductive layer $F_i$ make up a substrate member 7.

The substrate member 7 is formed, for example, as follows:

A first layer, which will ultimately form the conductive layers $C_{11}$ to $C_{mn}$ and $D_1$ to $D_n$, and a second conductive layer, which will ultimately form the conductive layers 3 and 5, are deposited in that order on the substrate 1 through a known method, for instance, a sputtering or electron beam evaporation process.

Next, the first and second conductive layers are subjected to a known pattern process using a first mask, providing the conductive layers $C_{11}$ to $C_{mn}$, m×n third conductive layers of the same pattern as the overlying conductive layers $C_{11}$ to $C_{mn}$, the conductive layers $D_1$ to $D_n$ and n fourth conductive layers of the same pattern as the overlying conductive layers $D_1$ to $D_n$.

Next, the third and fourth conductive layers are patterned by a known method using a second mask into the conductive layers 3 on the conductive layers $C_{11}$ to $C_{mn}$ and the conductive layers 5 on the conductive layers $D_1$ to $D_n$.

Next, a non-single-crystal semiconductor layer laminate member, which will ultimately form the non-single-crystal semiconductor layer laminate members $Q_1$ to $Q_n$, is deposited by a known method, for example, a plasma CVD or photo CVD method on the substrate, in a manner to continuously extend covering the conductive layers $C_{11}$ to $C_{mn}$ and the conductive layer 3.

In my experiment, a glow discharge was produced over the substrate 1 at a high frequency of 13.56 MHz in an atmosphere containing silane $SiH_4$, phosphine $PH_3$ (or diborane $B_2H_6$) and hydrogen, with the substrate temperature held in the range of 200° to 250° C. As a result of this, an n(or p)-type microcrystalline silicon layer, which had a conductivity of $10^{-2}$ to $10^2$ $(\Omega cm)^{-1}$ and contained hydrogen as a recombination center neutralizer, was deposited 300 to 1000 Å thick on the substrate 1. Next, only silane or hydrogen fluoride ($SiF_4$, $H_3SiF$, $H_2SiF_2$ or $SiF_2$) was discharged into a plasma, by which an i-type non-single-crystal silicon layer was deposited 0.2 to 1 $\mu$m thick on the n-type layer. After this, another n(or p)-type layer similar to the above n(or p)-type layer was deposited by the same method on the i-type non-single-crystal silicon layer, thus obtaining the laminate member having the n(or p)-i-n(or p) structure. By the use of diborane ($B_2H_6$) (or phosphine $PH_3$) for the formation of the i-type layer of the n(or p)-i-n(or p) structure, the laminate member can be formed as an n(or p)-p⁻-n(or p) or (n(or p)-n⁻-n(or p)) structure. After the formation of the non-single-crystal semiconductor layer laminate member, a fifth conductive layer which would ultimately form the conductive layer 6a and a sixth conductive layer which would ultimately form the conductive layer 6b were deposited in that order on the laminate member through, for instance, the electron beam evaporation or sputtering method.

Next, the fifth and sixth conductive layers and the non-single-crystal semiconductor layer laminate member are patterned by a known method through a third mask into the conductive layers $F_1$ to $F_m$ respectively made up of the non-single-crystal semiconductor layer laminate members $Q_1$ to $Q_n$ and the conductive layers 6a and 6b.

Another substrate member 11, which is different from the aforementioned substrate member 7, is produced. The substrate member 11 has, on a substrate 12 corresponding to the substrate 1, a conductive layer $H_j$ which corresponds to the column of the conductive layers $C_{1j}$ to $C_{mj}$ and is substantially equal in width to them. The conductive layer $H_j$ can be obtained by forming a seventh conductive layer through a known method on the substrate 12 and then patterning the seventh conductive layer through a fourth mask.

The substrate member 11 is disposed upside down by a suitable support means (not shown) in opposing relation to the top of the substrate member 7 in parallel thereto. In this instance, the columns of the conductive layers $C_{1j}$ to $C_{mj}$ of the substrate member 7 and the conductive layer $H_j$ of the substrate member 11 are held face-to-face with each other.

A space defined by the substrate members 7 and 11 is filled with liquid crystal 13.

In the structure described above in conjunction with FIGS. 1 through 6, the part 2a of the conductive layer $C_{ij}$ on the substrate 1, a part 14 of the conductive layer $H_j$ on the substrate 12 which is face-to-face with the part 2a and a part 16 of the liquid crystal 13 between the parts 2a and 14 constitute a liquid crystal element $L_{ij}$ which employs the parts 12a and 14 as its electrodes E1 and E2, respectively. When a low voltage below 1.9 V or so is applied across the electrodes E1 and E2, the liquid crystal element $L_{ij}$ remains opaque, but when a high voltage above 2.7 V or so is applied, it becomes transparent.

Figure 7:
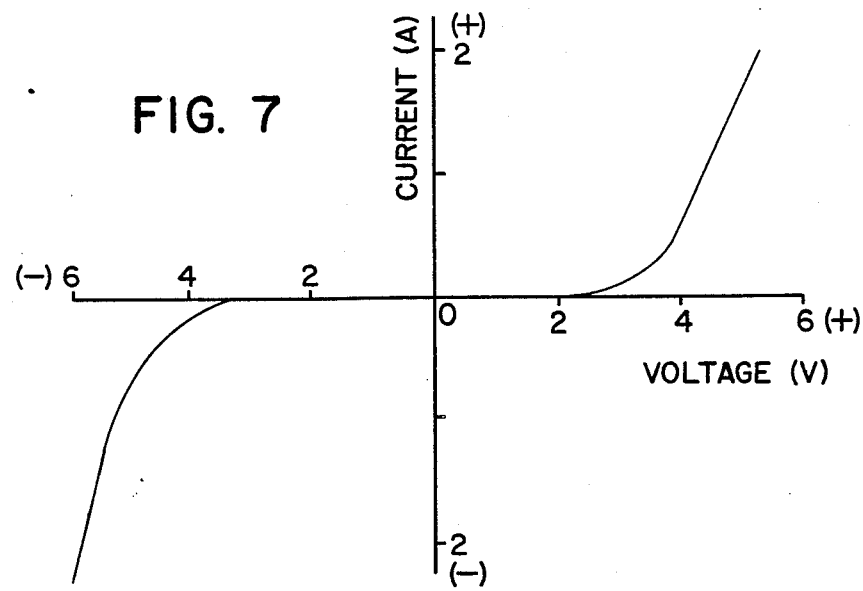
FIG. 7 is a graph showing the voltage(V)-current(A) characteristic of a non-single-crystal semiconductor diode used as a non-linear element in a liquid crystal display element of the optoelectronic panel of the present invention depicted in FIG. 1.
Figure 9A:
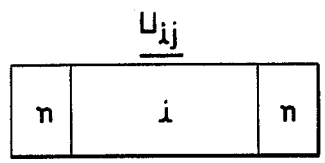
FIGS. 9A–9D are each a diagram showing energy bands of non-single-crystal semiconductor diodes for explaining their operations in the liquid crystal display device and the photo detecting device of the optoelectronic panel of the present invention depicted in FIG. 1.
Figure 9B:
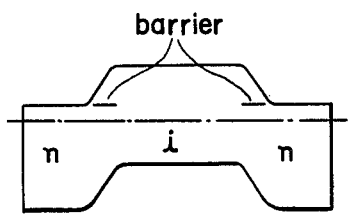
Figure 9C:
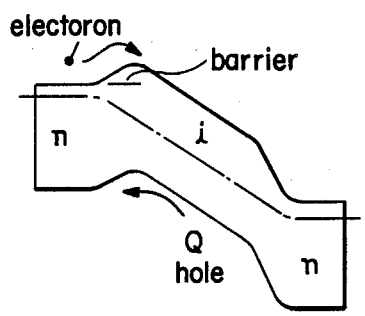
Figure 9D:
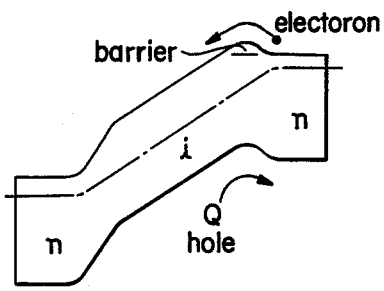
Figure 10:
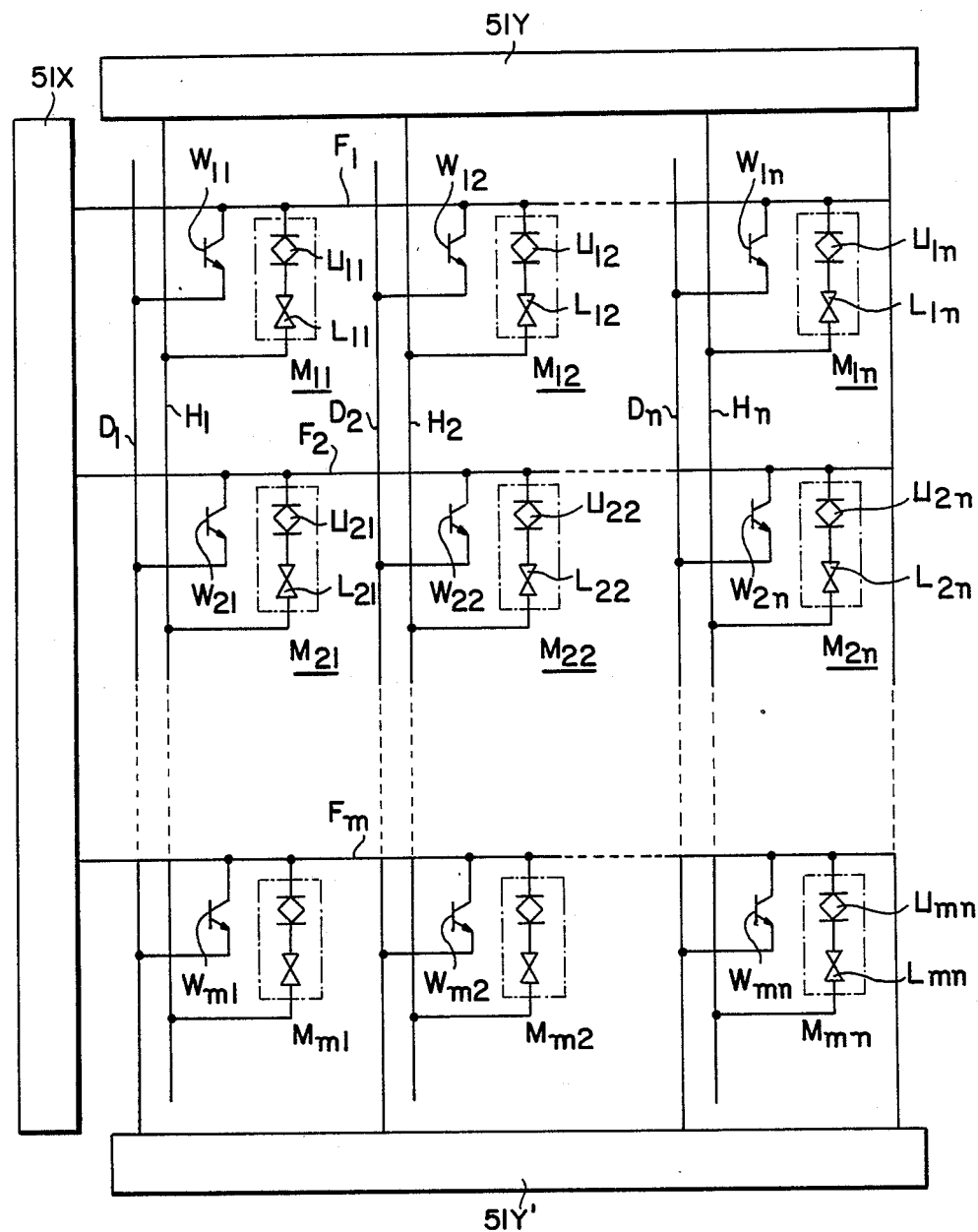
FIG. 10 is an electrical connection diagram of the optoelectronic panel of the present invention depicted in FIG. 1.

The conductive layer 3 overlying the conductive layer $C_{ij}$, a part 17 of the non-single-crystal semiconductor layer laminate member $Q_i$ overlying the conductive layer 3 and a part 18 of the conductive layer $F_i$ overlying the part 17 constitute a non-single-crystal semiconductor diode $U_{ij}$ which employs the parts 3 and 17 as its electrodes E3 and E4, respectively. The diode $U_{ij}$ presents such a nonlinear voltage(V)-current(A) characteristic as shown in FIG. 7. The diode $U_{ij}$ has an offset voltage of 1.5 to 2.0 V which is intermediate between the voltage that makes the liquid crystal element $L_{ij}$ transparent and nontransparent, respectively. The reason for which the diode $U_{ij}$ presents such a nonlinear characteristic as shown in FIG. 7 is as follows: When no voltage is applied across the electrodes E3 and E4, the energy band structure of the diode $U_{ij}$ of the construction depicted in FIG. 9A becomes as depicted in FIG. 9B; When a voltage is applied which makes the electrode E4 positive relative to the electrode E3, the energy band structure becomes as shown in FIG. 9C; and a voltage is applied which makes the electrode E3 positive relative to the electrode E4, the energy band structure becomes as shown in FIG. 9D. The liquid crystal element $L_{ij}$ and the diode $U_{ij}$ have their electrodes E1 and E3 electrically connected via the conductive layer $C_{ij}$, and hence are connected in series with each other, making up a liquid crystal display device $M_{ij}$.

Figure 8:
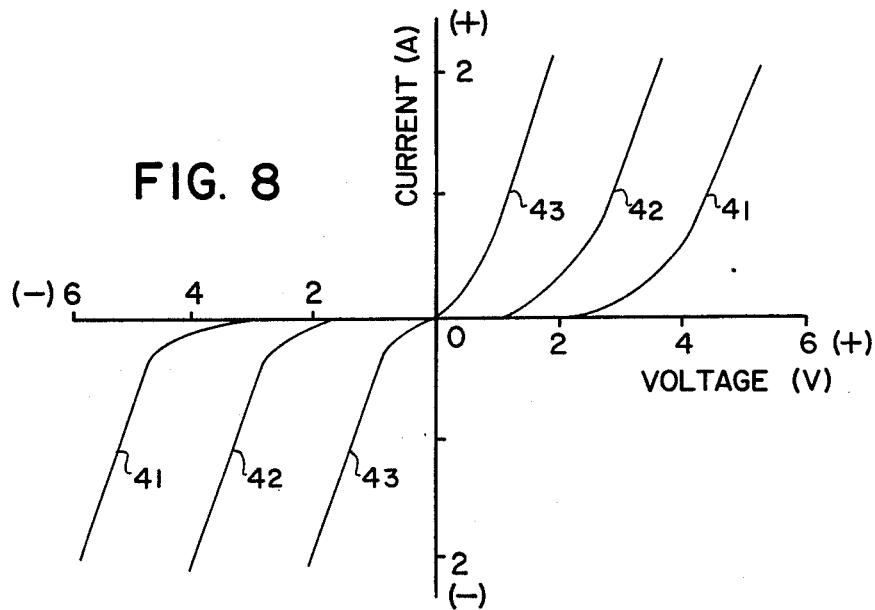
FIG. 8 is a graph showing the voltage(V)-current(A) characteristic of a non-single-crystal semiconductor diode used as a non-linear element in a photo detecting device of the optoelectronic panel of the present invention, using the light intensity as a parameter.

The part 4a of the conductive layer $D_j$ underlying the non-single-crystal semiconductor layer laminate member $Q_i$, a part 21 of the non-single-crystal semiconductor layer laminate member $Q_i$ overlying the part 4a and a part 22 of the conductive layer $F_i$ overlying the part 21 constitute a non-single-crystal semiconductor diode $W_{ij}$. The diode $W_{ij}$ has a similar voltage(V)-current(A) characteristic as the diode $U_{ij}$ but by which voltage is shifted according to the light intensity, as indicated by the curves 41, 42 and 43 in FIG. 8. The curve 41 shows the voltage-current characteristic when the diode is not irradiated by light, and the curve 43 and 43 the voltage-current characteristics when the diode is irradiated by light with intensities of 450 and 550 lux, respectively.

According to the arrangement described above with respect to FIGS. 1 through 6, the electrodes E2 of the liquid crystal elements $L_{1j}$ to $L_{mj}$ of the liquid crystal display devices $M_{i1}$ to $M_{in}$ are connected to the conductive layer $H_j$ acting as a column line, the electrodes E3 of the diodes $U_{i1}$ to $U_{in}$ serving as nonlinear elements are connected to the conductive layer $F_i$ serving as a row line, the electrodes E5 of the diodes $W_{1j}$ to $W_{mj}$ acting as photo diodes are connected to the conductive layer $D_j$ acting as a column line and the electrodes E6 of the diodes $W_{ij}$ to $W_{in}$ are connected to the conductive layer $F_i$ acting as a row line.

Therefore, according to the arrangement described above in connection with FIGS. 1 to 6, since the liquid crystal element $L_{ij}$ can be controlled to be transparent or nontransparent by applying, through use of row and column decoders 51X and 51Y, across the liquid crystal display device $M_{ij}$ via the conductive layers $F_i$ and $H_j$ a drive signal which assumes a low voltage below about 1.9 V and a high voltage above 2.7 V or so, an image display can be provided.

Furthermore, by irradiating the photo diode $W_{ij}$ with a light beam having an intensity of, for example, 500 lux, through use of a light pen, an output resulting from the detection of the light directed to the photo diode $W_{ij}$ can be obtained with the row decoder 51X and another column decoder 51Y'. Accordingly, by describing a locus of a light beam on the outer surface of the substrate 1, it is possible to obtain an output representative of the coordinates of the locus.

It will be apparent that the above embodiment should be construed as merely illustrative of the present invention and should not be construed as limiting the invention specifically thereto and that various modifications and variations may be effected without departing from the scope of the novel concepts of the invention.

What is claimed is:

1. An optoelectronic write/display panel comprising an M×N matrix of pixels where each pixel includes (a) write means including a photodetector and (b) display means including a liquid crystal layer and an active, non-linear element connected to the liquid crystal layer;
   a first decoder (51X) having at least one line respectively connected to the write means and display means in each row of said pixels;
   a second decoder (51Y) having at least one line connected to the display means in each column of said pixels; and
   a third decoder (51Y') having at least one line connected to the write means in each column of said pixels;
   whereby a selected one of said display means can be actuated by actuating one of the lines from said first decoder and one of the lines from said second decoder and a selected one of said write means can be actuated by actuating one of the lines from said first decoder and one of the lines from said third decoder and
   whereby said one display means and said one write means can be simultaneously actuated by simultaneously actuating said one lines from said first, second and third decoders; wherein each of said photodetector and said non-linear element include a common triple-layered semiconductor comprising a non-single crystal material selected from the group consisting of NIN, NNN, and NPN.

2. The panel of claim 1 wherein said liquid crystal is a twisted nematic liquid crystal.

3. The panel of claim 1 wherein said pixels are arranged of a plurality of column strips and a plurality of row strips wherein the pixels along a column share a common semiconductor layer.

4. The panel of claim 3 wherein the pixels along a column share an electrode in the form of strip.

5. A panel as in claim 1 where said photodetector and said non-linear element of each pixel are electrically isolated from one another.

6. A panel as in claim 1 where M=1.

7. A panel as in claim 1 where N=1.

8. A photoelectric panel with a plurality of pixels, such pixel comprising:
   a liquid crystal layer;
   a triple-layered semiconductor incorporating at least a first N-layer, a substantially I-layer, and a second N-layer in the foregoing order;
   a common electrode;
   a first electrode for a first portion of said triple-layered semiconductor which constitutes, in cooperation with said common electrode, a photosensitive element forming a photodetector;
   a second electrode electrically isolated from the first electrode, said second electrode being for a second portion of said triple-layered semiconductor and the liquid crystal layer to constitute, in cooperation with said common electrode, a display pixel adjacent to said photodetector where the second portion of the triple-layered semiconductor corresponds to an active, non-linear element electrically coupled to the liquid crystal layer;
   wherein said electrode arrangements are composed of a plurality of column strips and a plurality of row strips and the pixels along a column share said triple-layered semiconductor.

9. The panel of claim 8 wherein said liquid crystal is a twisted nematic liquid crystal.

10. The panel as defined in claim 8, wherein said triple-layered semiconductor comprises a continuous strip along the length of said column.

11. A photoelectric panel with a plurality of pixels arranged in a matrix, such pixels comprising:
   a liquid crystal layer;
   a triple-layered semiconductor incorporating at least a first N-layer, a substantially I-layer, and a second N-layer in the foregoing order;
   a common electrode;
   a first electrode for a first portion of said triple-layered semiconductor which constitutes, in cooperation with said common electrode, a photosensitive element forming a photodetector;
   a second electrode electrically isolated from the first electrode, said second electrode being for a second portion of said triple-layered semiconductor and the liquid crystal layer to constitute, in cooperation with said common electrode, a display pixel adjacent to said photodetector where the second portion of the triple-layered semiconductor corresponds to an active, non-linear element electrically coupled to the liquid crystal layer;

wherein said electrode arrangements are composed of a plurality of column strips and a plurality of row strips, and the pixels along a column share an electrode in the form of a strip.

12. A photoelectric panel with a plurality of pixels, such pixel comprising:
   a liquid crystal layer;
   a triple-layered semiconductor incorporating at least a first N-layer, a substantially I-layer doped with one of phosphorous and boron, and a second N-layer in the foregoing order;
   a common electrode;
   a first electrode for a first portion of said triple-layered semiconductor which constitutes, in cooperation with said common electrode, a photosensitive element forming a photodetector;
   a second electrode electrically isolated from the first electrode, said second electrode being for a second portion of said triple-layered semiconductor and the liquid crystal layer to constitute, in cooperation with said common electrode, a display pixel adjacent to said photodetector where the second portion of the triple-layered semiconductor corresponds to an active, non-linear element electrically coupled to the liquid crystal layer.

13. A photoelectric panel with a plurality of pixels, such pixel comprising:
   a liquid crystal layer;
   a triple-layered semiconductor comprising non-single crystal material incorporating at least a first N-layer, a substantially I-layer, and a second N-layer in the foregoing order;
   a common electrode;
   a first electrode for a first portion of said triple-layered semiconductor which constitutes, in cooperation with said common electrode, a photosensitive element forming a photodetector;
   a second electrode electrically isolated from the first electrode, said second electrode being for a second portion of said triple-layered semiconductor and the liquid crystal layer to constitute, in cooperation with said common electrode, a display pixel adjacent to said photodetector where the second portion of the triple-layered semiconductor corresponds to an active, non-linear element electrically coupled to the liquid crystal layer.

14. A photoelectric panel with a plurality of pixels, such pixel comprising:
   a liquid crystal layer;
   a triple-layered semiconductor incorporating at least a first N-layer, a substantially I-layer, and a second N-layer in the foregoing order;
   a common electrode;
   a first electrode for a first portion of said triple-layered semiconductor which constitutes, in cooperation with said common electrode, a photosensitive element forming a photodetector;
   a second electrode electrically isolated from the first electrode, said second electrode being for a second portion of said triple-layered semiconductor and the liquid crystal layer to constitute, in cooperation with said common electrode, a display pixel adjacent to said photodetector where the second portion of the triple-layered semiconductor corresponds to an active, non-linear element electrically coupled to the liquid crystal layer;
   wherein said triple-layered semiconductor comprises a continuous strip which extends from said first portion to said second portion of said triple-layered semiconductor.

15. A photoelectric panel with a plurality of pixels, such pixel comprising:
   a liquid crystal layer;
   a triple-layered semiconductor incorporating at least a first N-layer, a substantially I-layer, and a second N-layer in the foregoing order;
   a common electrode;
   a first electrode for a first portion of said triple-layered semiconductor which constitutes, in cooperation with said common electrode, a photosensitive element forming a photodetector;
   a second electrode electrically isolated from the first electrode, said second electrode being for a second portion of said triple-layered semiconductor and the liquid crystal layer to constitute, in cooperation with said common electrode, a display pixel adjacent to said photodetector where the second portion of the triple-layered semiconductor corresponds to an active, non-linear element electrically coupled to the liquid crystal layer;
   wherein the liquid crystal layer and non-linear element of each pixel is accessed by row and column decoders (51X and 51Y) and the photodetector is accessed by said row decoder (51X) and a further column decoder (51Y'), where said row and column decoders (51X and 51Y) are connected to said common electrode and said second electrode, respectively, and where said column decoder (51Y') is connected to said first electrode.

* * * * *